United States Patent [19]

O'Leary

[11] 3,715,519

[45] Feb. 6, 1973

[54] DEVICE FOR CONVERTING TABLE TELEPHONE TO WALL TELEPHONE

[75] Inventor: Timothy J. O'Leary, Houston, Tex.

[73] Assignee: The Raymond Lee Organization, Inc., New York, N.Y.

[22] Filed: June 24, 1971

[21] Appl. No.: 156,384

[52] U.S. Cl. ...........179/100 C, 179/146 R, 179/178, D26/14 A

[51] Int. Cl. ...............................................H04m 1/11

[58] Field of Search .........179/100 R, 100 D, 100 C, 179/146 R, 147 R, 178, 179, 184, 189 R; D26/14.1, 14 A

[56] References Cited

UNITED STATES PATENTS

| | | | |
|---|---|---|---|
| 2,878,324 | 3/1959 | Guerrero | 179/146 R |
| 3,480,741 | 11/1969 | Wiggins | 179/146 R |
| 2,928,909 | 3/1960 | Allen | 179/147 |

*Primary Examiner*—Ralph D. Blakeslee
*Assistant Examiner*—Randall P. Myers
*Attorney*—Richard S. Shreve, Jr.

[57] ABSTRACT

A device for converting a table telephone to a wall telephone wherein: the handset is held in normal cradle position even when the base is tilted forward; the handset can be easily removed from the cradle at all times; the telephone can be readily reconverted for table use; the dial face is held essentially vertical; and space is provided for storage of miscellaneous small items.

2 Claims, 3 Drawing Figures

INVENTOR.
TIMOTHY J. O'LEARY

DEVICE FOR CONVERTING TABLE TELEPHONE TO WALL TELEPHONE

SUMMARY OF THE INVENTION

In my invention, the handset of a standard table model telephone is to be maintained in the normal cradle position on the base and be of normal accessibility for use while the base is tilted forward until the dial face is in a near-vertical position. The base and handset support devices permit a standard table model telephone to be mounted on any vertical or near-vertical surface (e.g., wall, side of cabinet, etc.) or to stand on a table or desk in the tilted position so as to reduce the horizontal surface area occupied by the telephone.

HANDSET SUPPORT DEVICE

The handset support device meets three requirements as follows:

1. Keeps the handset in its normal cradle position even when the base is tilted forward at a severe angle;
2. Maintains practically normal ease-of-removal and replacement of the handset from its cradle;
3. Does not damage or deface the original telephone equipment.

The above objectives can be attained in several ways as follows:

1. Provide mechanical support beneath the mouthpiece and earpiece ends of the handset as it rests in its normal cradle position in order to: (a) resist the twisting force produced by gravity on the handset that results when the base is tilted forward and normally results in the handset slipping from its cradle; and (b) provide a limited hold-down force for the handset by providing a high-friction, or suction, or partially adhesive material on the handset support members at the points of contact with the mouthpiece and earpiece ends of the handset. Or, alternatively, provide extensions to the support members that partially curve over the back sides of the mouthpiece or earpiece ends of the handset when in the normal cradle position. The mechanical support device is secured to either the base or handset with clip-on appliances or with non-reactive adhesive that does not damage the surface of the original equipment.
2. Provide "dry" adhesion or magnetic attraction of the handset to the base by providing mutually adhesive or magnetically attractive surfaces both on the inside of the center of the handset and on the corresponding area of the base immediately beneath the handset. These surfaces are secured to the respective components with clip-on appliances or non-reactive adhesive that would not damage the surface of the original equipment.

BASE TILTING AND HOLDING DEVICE

The telephone base holding device must be capable of firmly holding the telephone base in a tilted position so that the dial surface of the telephone is in near-vertical alignment and still permit the base to be quickly and easily removed from the holding device. The base tilting and holding device can be mountable on either a vertical surface (e.g., wall, side of cabinet, etc.) or be able to rest on a horizontal surface (table top, desk top, etc.) so that horizontal surface area requirements are reduced. Means are provided by which the wall-to-base line cord can be concealed when the telephone base is in the tilted holding position.

DETAILED DESCRIPTION OF PREFERRED EMBODIMENTS

Figure 1:
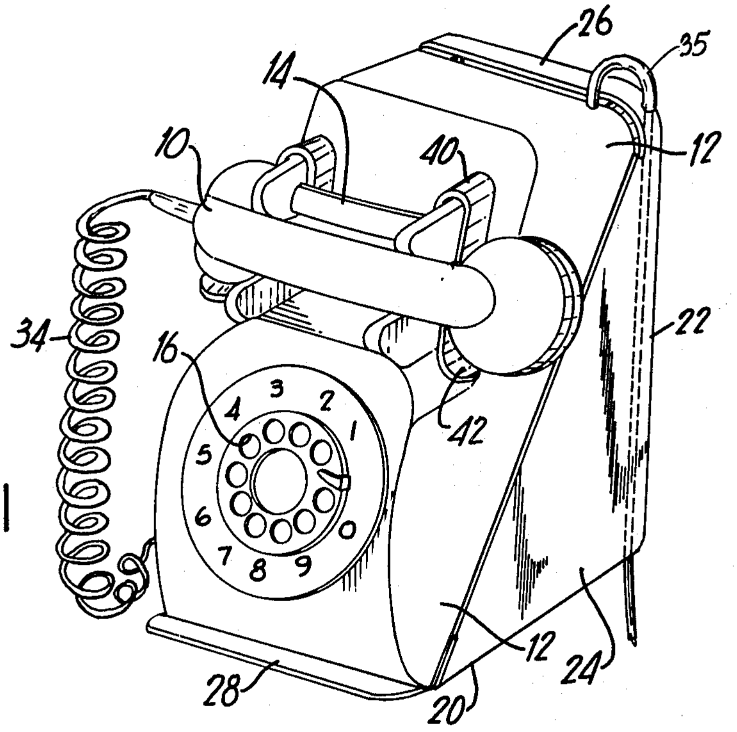
FIG. 1 is a perspective view of my invention in use.
Figures 2, 3:
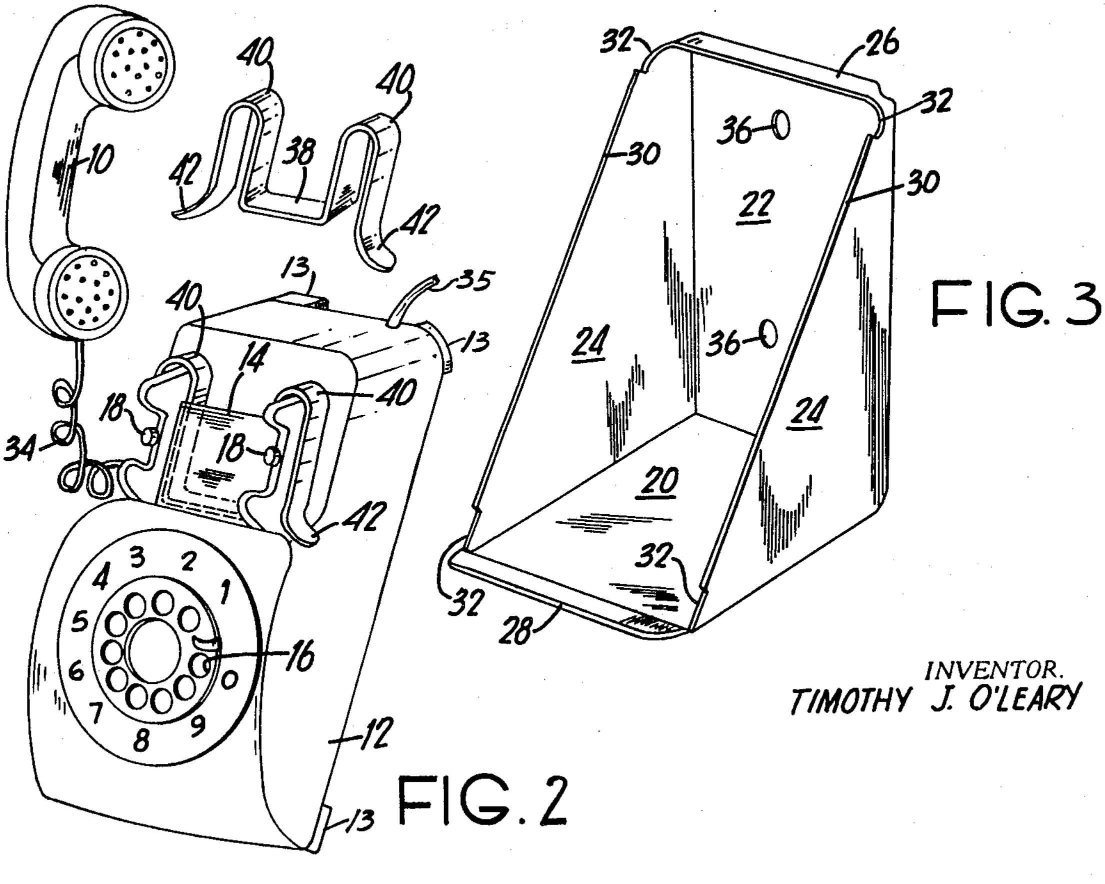
FIG. 2 is a perspective view of a handset support device in accordance with my invention.
FIG. 3 is a perspective view of a base tilting and holding device in accordance with my invention.

Referring now to FIGS. 1-3, a conventional table telephone employs a handset 10, a base 12 having legs 13, a cradle 14, a dial face 16, contact button 18 in the cradle, a handset-to-base cord 34, and a wall-to-base cord 35.

A base tilting and holding device has a horizontal bottom 20, a vertical back 22, triangular side walls 24 connected between back and bottom in parallel vertical planes, a top horizontal lip 26 extending outward from the back between the wall 24 and a bottom lip 28 extending inclinedly upward and outward. Walls 24 have inclined exposed edges 30 adapted to receive base 12 detachably flush with wall 24 and with recesses 32 adapted to receive legs 13, whereby the base can be held with face 16 essentially vertical. Holes 36 in back 22 can receive screws to hold the back in vertical position. Pencils, clips and other small items can be held on lip 28 or concealed under the base on surface 20.

A U shaped clip 38 has bent over legs 40 with flared curved fingers 42. The clip fits over the cradle in such manner that the fingers will press against the mouthpiece and earpiece ends of the handset to provide support to hold the handset in normal cradle position when the base is tilted forward. This support resists the torque exerted by gravity that would otherwise cause the handset to slip from the cradle. A gravity vector coupled with friction between the handset and clip also provides a "hold-down" force to fully maintain the handset in cradle position unless it is deliberately removed by the user.

Normally, the handset "hold-down" force described above must be supplemented to insure that the handset maintains sufficient pressure on the contact buttons 18 on the cradle so that the telephone circuit is not closed. The additional "hold-down" force can be supplied by means of one or more of the following methods:

1. Apply a high-friction or suction material to the handset support fingers 42 at their points of contact with the handset mouthpiece and earpiece. A clinging type plastic or rubber, whether solid or spongy, or whether with or without small molded-in suction cups, can be used for this purpose. This is the method intended for use with the structure shown in the drawings.
2. Curve the telephone handset support fingers so that they slightly curve over the back sides of the mouthpiece and earpiece ends of the handset. This provision requires that a slight upward twisting motion of the handset be used when it is removed from, or placed upon, its cradle. However, this motion does not constitute an appreciable inconvenience in normal use of the telephone.

3. Apply a clinging plastic, suction or magnetic adhesive material to the middle-underside of the handset and/or to the telephone base at a point directly beneath the middle of the handset when it is in the normal cradle position.

While I have described my invention with particular reference to the drawings, such is not to be considered as limiting its actual scope.

Having thus described this invention, what is asserted as new is:

1. A device for converting a table telephone having a handset, base with cradle and dial face into a wall telephone comprising:

first, base tilting and holding means secured to a wall and adapted to detachably hold said base in a position at which the dial face is essentially vertical and the cradle is held above said face; and second, handset support means for holding the handset in the normal cradle position even when the base is tilted forward at a severe angle, while, simultaneously, not interfering with the normal operation of manually removing or replacing the handset on its cradle:

said handset supporting means comprising a U-shaped clip having bent over legs with flared curved fingers;

said clip fitting over the cradle in such a manner that said fingers will press against the mouthpiece and earpiece ends of the handset.

2. A device as set forth in claim 1 wherein said first means provides storage space below said base for storage of miscellaneous small items; and includes a vertical back, a horizontal bottom and two triangularly shaped vertical side walls which are parallel and secured to both back and bottom.

* * * * *